（12) United States Patent
Osburn, III

(10) Patent No.: US 8,402,686 B1
(45) Date of Patent: *Mar. 26, 2013

(54) LIGHT EMITTING FISHING TEASER

(75) Inventor: Douglas C. Osburn, III, Houston, TX (US)

(73) Assignee: Wasabi, LLC, Houston, TX (US)

(*) Notice: Subject to any disclaimer, the term of this patent is extended or adjusted under 35 U.S.C. 154(b) by 452 days.

This patent is subject to a terminal disclaimer.

(21) Appl. No.: 12/630,717

(22) Filed: Dec. 3, 2009

Related U.S. Application Data

(63) Continuation-in-part of application No. 11/627,665, filed on Jan. 26, 2007, now Pat. No. 7,707,764.

(51) Int. Cl.
*A01K 85/01* (2006.01)
(52) U.S. Cl. .......................... 43/17.6; 43/17.5; 43/42.24
(58) Field of Classification Search .................. 43/17.5, 43/17.6, 42.1, 42.11, 42.24, 42.32, 42.33, 43/42.34
See application file for complete search history.

(56) References Cited

U.S. PATENT DOCUMENTS

| | | | |
|---|---|---|---|
| 4,175,348 A | 11/1979 | Ray | |
| 4,669,213 A * | 6/1987 | LeRoy | 43/17.6 |
| 4,799,327 A * | 1/1989 | Treon | 43/17.6 |
| 4,811,513 A * | 3/1989 | Grobl | 43/17.6 |
| 4,888,905 A * | 12/1989 | Garr | 43/17.6 |
| 5,157,857 A * | 10/1992 | Livingston | 43/17.6 |
| 5,461,815 A | 10/1995 | Rodgers | |
| 6,029,388 A | 2/2000 | Yokogawa et al. | |
| 6,185,857 B1 * | 2/2001 | Hnizdor | 43/42.11 |
| 6,286,246 B1 | 9/2001 | Rachal et al. | |
| 6,647,659 B1 * | 11/2003 | King et al. | 43/17.6 |
| 6,922,935 B2 | 8/2005 | Yu | |
| 7,137,222 B2 | 11/2006 | Aanenson | |
| 7,707,764 B1 * | 5/2010 | Osburn | 43/17.6 |
| 2004/0200122 A1 | 10/2004 | Aanenson et al. | |
| 2004/0244265 A1 | 12/2004 | Miyata et al. | |

* cited by examiner

*Primary Examiner* — David Parsley
(74) *Attorney, Agent, or Firm* — Buskop Law Group, P.C.; Wendy Buskop

(57) ABSTRACT

A light emitting fishing teaser with a translucent lure head, an enable terminal, a charging terminal, a ground terminal, an energy source, a control circuit board, a light emitting circuit board, a convex lens formed by an outside surface of the translucent lure head, a leader secured to a fishing line and extending through the cylindrical lure cavity and connecting to a fishing lure, and a lure skirt. A plurality of light emitting fishing teasers disposed on a leader forming a daisy chain of light emitting fishing teasers.

20 Claims, 6 Drawing Sheets

LIGHT EMITTING FISHING TEASER

CROSS REFERENCE TO RELATED APPLICATIONS

The present application is a Continuation-in-Part application which claims priority to co-pending U.S. patent application Ser. No. 11/627,665, entitled "LIGHT EMITTING FISHING LURE", filed on Jan. 26, 2007, the entirety of which is incorporated herein by reference.

FIELD

The present embodiments generally relate to a light emitting fishing teaser and a daisy chain of light emitting fishing teasers.

BACKGROUND

A need exists for a fishing teaser capable of at least two fish attracting modes. In an embodiment of one mode, selectively focused, directed emitted light can simulate the appearance and motion of baitfish under daylight conditions. In an embodiment of a second mode, selectively focused and sequenced, directed emitted light can simulate the bioluminescence of deepwater marine animals under low light conditions such as darkness or at subsurface ocean depths.

A further need exists for a fishing teaser capable of using a variety of energy sources that can be replaceable or rechargeable.

A need exists for a fishing teaser containing circuitry that can create emitted light in flashes or patterns that can attract specific marine game fish.

A need also exists for a fishing teaser that can be adapted to produce light of varying colors and intensities.

A further need exists for a simplified fishing teaser possessing circuitry that allows the teaser to automatically self-illuminate in the presence of seawater and automatically cease illumination when removed from seawater.

The present embodiments meet these needs.

BRIEF DESCRIPTION OF THE DRAWINGS

The detailed description will be better understood in conjunction with the accompanying drawings as follows.

Figure 1:
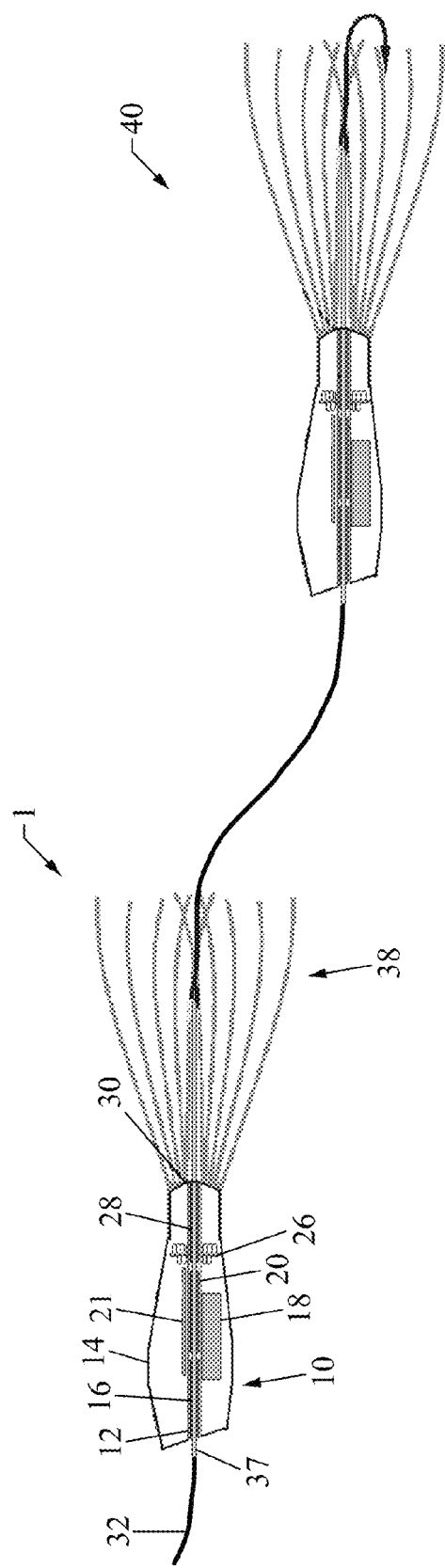
FIG. 1 depicts a cross-sectional view of an embodiment of the light emitting fishing teaser.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a light emitting fishing teaser and a daisy chain of light emitting fishing teasers.

Little is know of the life cycle of pelagic fish such as marlin, swordfish, sailfish, and tuna which have enormous economic and food value. These fish are believed to swim great distances crossing oceans and many international marine management jurisdictions over periods of weeks and months, but nothing is known of the motivation for this migratory behavior. The adaptation of these fish to the open ocean is so complete, marine biologists have had very little success maintaining healthy specimens in captivity for extended studies.

Much of what is known or believed regarding these animals has been gleaned from the experience and records of conservation minded sportsmen who fish for them. With regard to their feeding habits, it is believed by sportsmen that billfish such as marlin and sailfish locate prey by sight near the ocean surface and do not feed under the low light conditions of ocean depths or at night. As a result, no fishing lures have been developed for use under these low light conditions.

However, during periods of darkness, deepwater marine animals such as squid, which are known to be a significant fraction of the pelagic fish diet, rise in the water column to intermediate depths, and sometimes the surface, where they are more accessible to feeding fish. Additionally, a key visual attraction of these deepwater marine animals is the ability of their bodies to generate light when stressed or excited. This light generation capability is called bioluminescence. A fishing teaser designed for these low light conditions that simulates bioluminescence can be highly effective in catching pelagic fish.

Light emitting fishing teasers can attract increased fish attention, resulting in successful and productive fishing for both recreational and commercial purposes. More productive and more efficient fishing can result in an increased food supply in many communities, and an improved economy, such as in coastal communities.

The present fishing teaser can have circuitry capable of providing continuous light, flashing light, and light that is emitted in patterns and sequences, to increase fish attention and attract marine game fish such as marlin, swordfish, sailfish, bluefin tuna, yellowfin tuna, and others. The present teaser can also be adapted to emit different pulsating or flashing lights during daylight or nighttime operation.

The circuitry and terminals within the light emitting fishing teaser can be encapsulated such that they are mostly surrounded by a translucent lure head, providing partial protection from marine elements, protecting the circuitry and terminals from damage due to handling or transport, and preventing damage that can be caused by large and aggressive game fish.

The positioning of the light emitting circuitry in embodiments can be such that the emitted light illuminates a translucent lure head and a lure skirt attached to the rear of the translucent lure head. The majority of the emitted light can be focused on the tail or lure skirt, which highlights the motion of the tail, more effectively imitating marine baitfish. The rear portion of the translucent lure head can act as a convex lens in order to focus the emitted light on the entire lure skirt.

The lure skirt and lure head of embodiments can be tinted in different colors to mimic different marine animals. The lure head and lure skirt can also be tinted with phosphorescent material that will emit additional light when stimulated by light emitted from the circuitry.

The light emitting fishing teaser can also contain one or more light emitting diodes of varying colors and intensities that can be individually, sequentially, or simultaneously operated.

The light emitting fishing teaser can also be self-illuminating, possessing circuitry that can be completed when the teaser contacts water, including seawater, causing use of the teaser to be a very simple task requiring very little preparation, maintenance, or activity beyond the acts normally undertaken when fishing. This can further provide the advantage of eliminating the need for mechanical switches and electrical connectors, which can quickly become damaged or inoperable when exposed to the corrosive marine environment.

The present light emitting fishing teaser can also have charging circuitry and can utilize rechargeable power sources, or the teaser can be equipped with replaceable power sources.

The light emitting fishing teaser can have a translucent lure head. The lure head can be made from urethane, clear vinyl, clear epoxy resin, polyester, acrylic, or other similar materials. The translucent lure head can range from three inches to seven inches in length can be generally cylindrical, teardrop-shaped, or bullet-shaped. In embodiments, the translucent lure head can be approximately 6.28 inches in circumference, 2 inches in width, and 5.4 inches in length. The translucent lure head can have other dimensions as well.

The translucent lure head can have a cylindrical lure cavity passing longitudinally through the translucent lure head for receiving a leader.

In embodiments, a plurality of light emitting fishing teasers can be disposed on a leader forming a daisy chain of light emitting fishing teasers.

The leader can pass through the translucent lure head and can be attached to a fishing line, to at least one additional light emitting fishing teaser in the daisy chain of light emitting fishing teasers, to a fishing lure, or combinations thereof.

It is contemplated that the leader can pass through the translucent lure head of a light emitting fishing teaser and can be attached to a fishing line without attaching to a fishing lure.

The cylindrical lure cavity can also contain electrical terminals and can fill with water when the light emitting fishing teaser is submerged, allowing a completed circuit to be formed between the electrical terminals. The cylindrical lure cavity can have a diameter ranging from about 0.18 inches to about 0.25 inches. The cylindrical lure cavity can have other dimensions as well. The cylindrical lure cavity can be an exposed cylindrical lure cavity.

The cylindrical lure cavity can accommodate water when the light emitting fishing teaser is submerged in water.

The translucent lure head can have an outside surface, which can be smooth or textured and made from an industrial polymer.

The outside surface of the translucent lure head can be tinted one or more colors to affect the color of the emitted light. It is also contemplated that the outside surface can be tinted with phosphorescent material to emit additional light when stimulated by light from the light emitting fishing teaser or by other light.

It is further contemplated that the translucent lure head can be selectively tinted in its entirety, or only partially, such that parts of the translucent lure head color emitted light or emit additional light, while other parts of the translucent lure head remain essentially transparent.

In embodiments, the forward portion of the translucent lure head can be tinted with phosphorescent material while the back portion of the translucent lure head is clear and transparent. This can create the appearance of a florescent glowing effect in the translucent lure head while focusing the maximum amount of light on the lure skirt. This arrangement can possess attractive qualities for game fish.

The outside surface of the translucent lure head can also be shaped to focus or direct the emitted light.

A charging terminal can be located within the cylindrical lure cavity. A charging terminal can be an electrically conductive tube and can be made from brass, stainless steel, or other similar materials.

An enable terminal, which can be an electrically conductive tube, can also be located within the cylindrical lure cavity. The enable terminal can be electrically isolated from the charging terminal. The enable terminal can be made from brass, stainless steel, or other similar materials.

A ground terminal can also be located within the cylindrical lure cavity, and can be electrically isolated from the charging terminal and from the enable terminal. The ground terminal can be an electrically conductive tube and can be made from brass, stainless steel, or other similar materials. The ground terminal can be in communication with the charging circuit.

It is contemplated that the charging terminal, the enable terminal, and the ground terminal can be partially encapsulated by the translucent lure head for protecting the charging terminal, the enable terminal, and the ground terminal from damage, such as that caused by handling, transport, or aggressive game fish. The charging terminal, the enable terminal, and the ground terminal can be encapsulated such that each terminal remains exposed to the cylindrical lure cavity, but protected from objects exterior to the light emitting fishing teaser.

The translucent lure head can further have an energy source encapsulated by the translucent lure head. The energy source can be a replaceable energy source. It is also contemplated that the energy source can be a rechargeable energy source. In embodiments, the energy source can be a nickel metal hydride battery or a lithium ion battery, such as 1000 mA hour, AAA NiMH batteries made by Duracell.

The translucent lure head can have a control circuit board, such as DOSP-1 made by AutoSol, which can have an excitation circuit, a charging circuit, or combinations thereof disposed thereon and encapsulated by the translucent lure head. The translucent lure head can have a light emitting circuit board, such as DOSP-LED made by AutoSol, encapsulated by the translucent lure head.

The light emitting circuit board can have one or more light emitting diodes or similar light emitting elements that can be white, one or more colors, or combinations thereof. The light emitting circuit board can also have elements capable of emitting multiple colors and intensities of light.

The light emitting diodes or other light emitting elements can also be separately encapsulated within the translucent lure head.

The energy source, the control circuit board, and the light emitting circuit board can be encapsulated by the translucent lure head such that they are sealed from contact with water when the light emitting fishing teaser is submerged.

The control circuit board can further comprise an excitation circuit, such as DOSP-5.DSN made by AutoSol, a charging circuit, such as DOSP-5.DSN made by AutoSol, or combinations thereof, disposed on the control circuit board. The excitation circuit or charging circuit can also be separately encapsulated in the translucent lure head.

The translucent lure head can further comprise a convex lens formed by the outside surface of the translucent lure head. The convex lens can focus the majority of the light emitted by the light emitting circuit board toward the head and tail of the light emitting fishing teaser.

The translucent lure head can be faceted to affect its appearance while emitting light to better attract fish attention and to focus and direct light emitted by light emitting diodes or similar elements. The translucent lure head can also have shapes molded in cabochon to affect its appearance and attract specific game fish.

The light emitting fishing teaser can further comprise a leader, which can be secured to a fishing line and can extend through the charging terminal, the enable terminal, and the ground terminal in the cylindrical lure cavity of a light emitting fishing teaser and can connect to a fishing lure.

In embodiments, the leader can include a first crimp that can maintain the translucent lure head of a first light emitting fishing teaser in a position on the leader as the light emitting fishing teaser is pulled through the water.

Additional light emitting fishing teasers in a daisy chain of light emitting fishing teasers can be held in positions on the leader by additional crimps. The daisy chain of light emitting fishing teasers can extend beyond the first crimp and can connect to a fishing lure.

The leader can be made from 300 pound test to 600 pound test monofilament line, and can generally be from about 10 feet to about 20 feet in length. The leader can be made from other monofilament line and can be other lengths as well.

The light emitting fishing teaser can also have a lure skirt attached to the translucent lure head. The lure skirt can be made from plastic, rubber, or similar materials and can be generally from about 10 inches to about 15 inches in length. It is contemplated that a lure skirt can be generally conical in shape, having a plurality of tassels or strands which can be moved by currents, a fishing line, and the motion of the light emitting fishing teaser while submerged, attracting fish attention. The lure skirt can have other shapes and dimensions.

The lure skirt can be tinted one or more colors to affect the color of the emitted light. It is also contemplated that the lure skirt can be tinted with phosphorescent material to emit additional light when stimulated by light from light emitting diodes or other light emitting elements.

The convex lens formed by the outside surface can focus the majority of the emitted light on the lure skirt, which can attract fish attention by mimicking the appearance and movement of many baitfish.

The enable terminal and ground terminal can be electrically isolated such that when submerged in water, such as seawater, the circuits can be activated; thereby activating the control circuit board which can then control the illumination of the light emitting circuit board. This can be accomplished through use of an excitation circuit within the control circuit board, or separately disposed within the translucent lure head.

Through this completed circuit, the light emitting fishing teaser can automatically self-illuminate when submerged, and automatically cease to illuminate when removed from a water source.

The charging terminal can be electrically isolated from the ground terminal such that when the charging terminal is connected to the positive terminal of a power supply and the ground terminal is connected to the negative terminal of the power supply, it will activate and begin to control the recharging of the energy source. This can be accomplished through use of a charging circuit within the control circuit board, or separately disposed within the translucent lure head. The charging circuit can be in communication with the charging terminal.

In operation, as the exposed cylindrical lure cavity accommodates water, an electrical circuit between the enable terminal and the ground terminal can be completed.

Referring now to FIG. 1, a cross-sectional view of an embodiment of the light emitting fishing teaser is depicted.

The light emitting fishing teaser 1 has a translucent lure head 10 with an outside surface 14, attached to a lure skirt 38. The translucent lure head 10 has a cylindrical lure cavity 12 passing longitudinally through the translucent lure head.

A charging terminal 16, an enable terminal 20, and a ground terminal 28 are disposed within the cylindrical lure cavity, such that the charging terminal, the enable terminal, and the ground terminal are electrically insulated from one another.

A leader 37 is depicted extending through the cylindrical lure cavity of the translucent lure head. The leader is shown attached to a fishing line 32 near the front of the translucent lure head 10. The leader 37 is also shown attached to a fishing lure 40 near the back of the lure skirt 38.

An energy source 18 and a control circuit board 21 are shown encapsulated in the translucent lure head. A light emitting circuit board 26 is encapsulated near the rear of the translucent lure head.

The light emitting circuit board 26 can have light emitting diodes or similar light emitting elements. It is also contemplated that light emitting diodes or other light emitting elements can be separately disposed and encapsulated within the translucent lure head.

The outside surface forms a convex lens 30 along the rear of the translucent lure head. The orientation of the light emitting circuit board within the translucent lure head is such that the majority of the emitted light illuminates the lure skirt. The convex lens disperses the emitted light to better illuminate the lure skirt and simulate the appearance and motion of baitfish.

Figure 2:
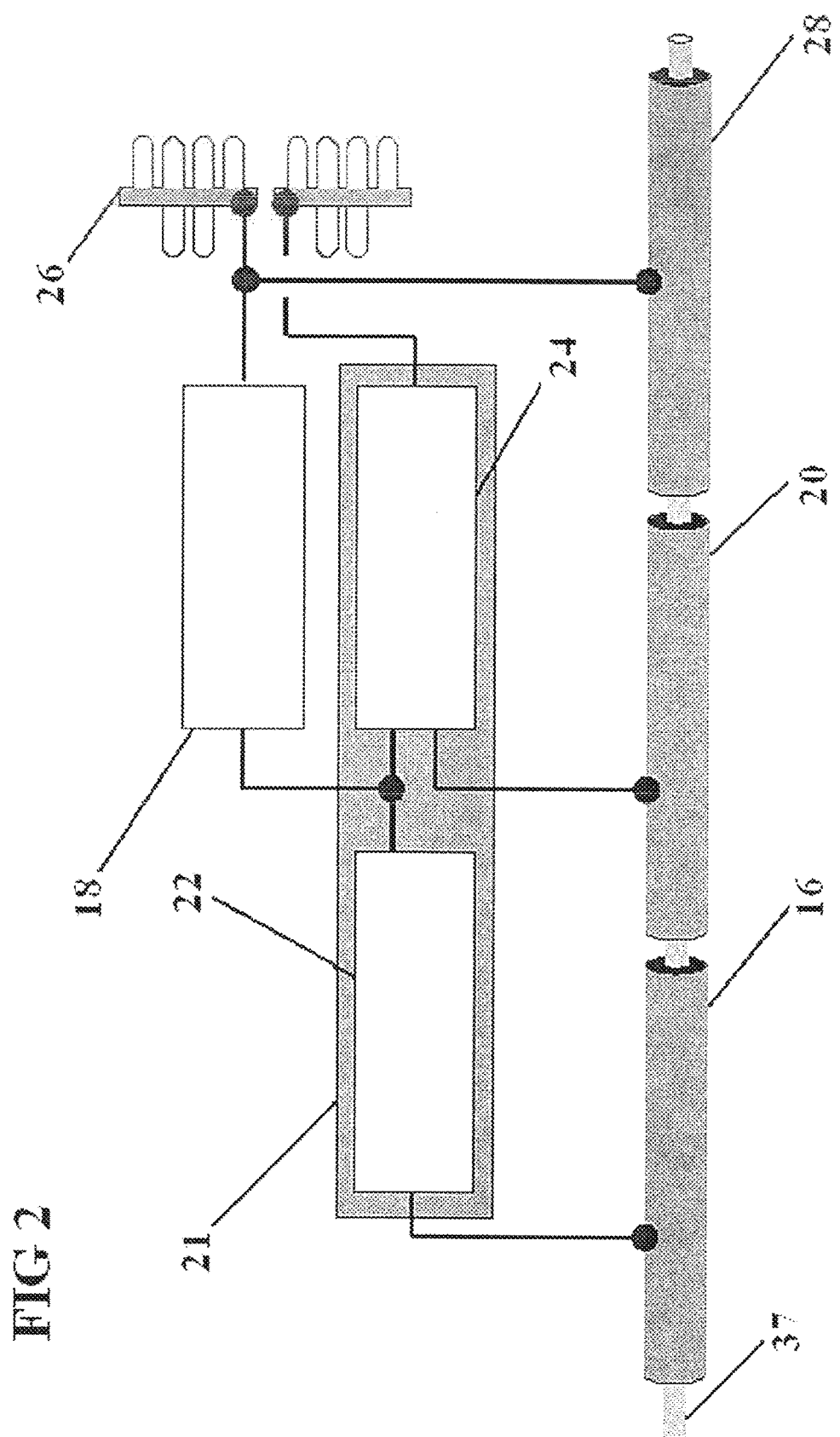
FIG. 2 depicts circuitry and terminals in an embodiment of the light emitting fishing teaser.

Referring to FIG. 2, a schematic of the terminals and circuitry contained within the translucent lure head is depicted.

The leader 37 is shown extending through the charging terminal 16, the enable terminal 20, and the ground terminal 28.

The charging terminal 16 can be connected to a charging circuit 22 within the control circuit board 21. The charging circuit is in turn connected to both an excitation circuit 24 within the circuit control board, and an energy source 18. Another embodiment of the light emitting fishing teaser can lack a charging circuit.

It is also contemplated that a charging circuit and an excitation circuit can be separately disposed and encapsulated within the translucent lure head.

The enable terminal is also connected to the excitation circuit. The excitation circuit is connected to the light emitting circuit board 26.

The ground terminal is connected to both the light emitting circuit board and the energy source.

This orientation of terminals and circuits allows the presence of water, such as seawater, disposed proximate or about the leader, the charging terminal, the enable terminal, and the ground terminal, to cause the light emitting fishing teaser to automatically activate, causing the emission of light from the light emitting circuit board.

When water fills the cylindrical lure cavity, the circuit between the enable terminal and the ground terminal can be completed, allowing current from the energy source to travel to the light emitting circuit board. This completed circuit also allows the excitation circuit, which can be part of the control circuit board, to control and operate the light emitting circuit board.

When the light emitting fishing teaser is removed from water, the cylindrical lure cavity can be emptied of water, breaking the circuit between the enable terminal and the ground terminal, causing the light emitting fishing teaser to automatically deactivate and to cease emissions from the light emitting circuit board.

Figure 3:
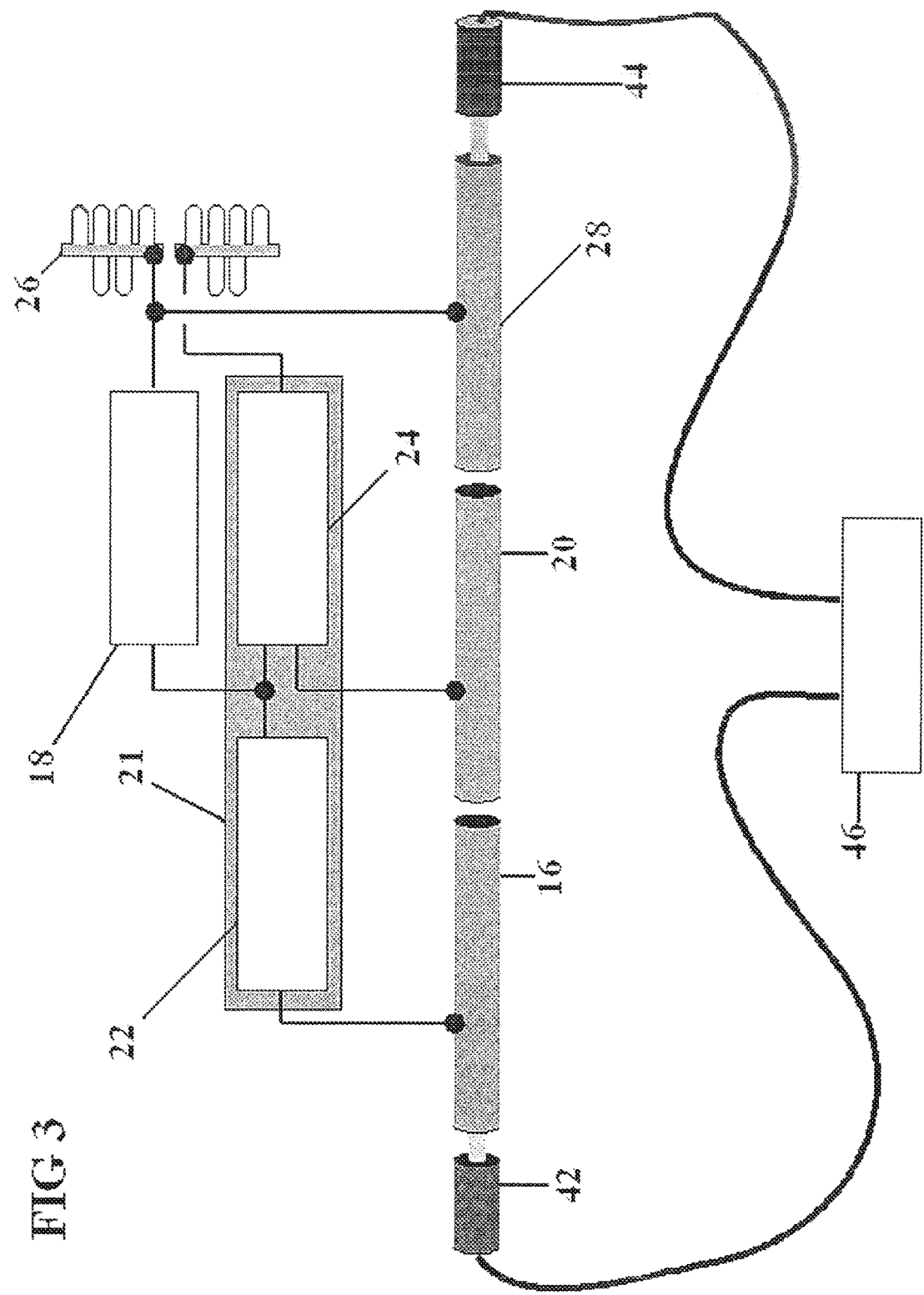
FIG. 3 depicts the circuitry and terminals of the light emitting fishing teaser with a charging power supply.

Now referring to FIG. 3, the circuitry and terminals of FIG. 2 are depicted, connected to a charging power supply 46.

The charging terminal 16, the enable terminal 20, and the ground terminal 28 are shown. The charging terminal is connected to the charging circuit 22 within the control circuit board 21. The charging circuit is in turn connected to the excitation circuit 24 and the energy source 18.

The enable terminal is connected to the excitation circuit, which is in turn connected to the light emitting circuit board 26. The ground terminal is connected to both the energy source and the light emitting circuit board.

The charging power supply is shown having a positive jack 42 and a ground jack 44. The positive jack is connected to the charging terminal, while the ground jack is connected to the ground terminal.

This connection completes a circuit between the charging terminal and the ground terminal, allowing current to flow from the charging power supply through the charging terminal, through the charging circuit within the control circuit board, and the energy source.

Figure 4:
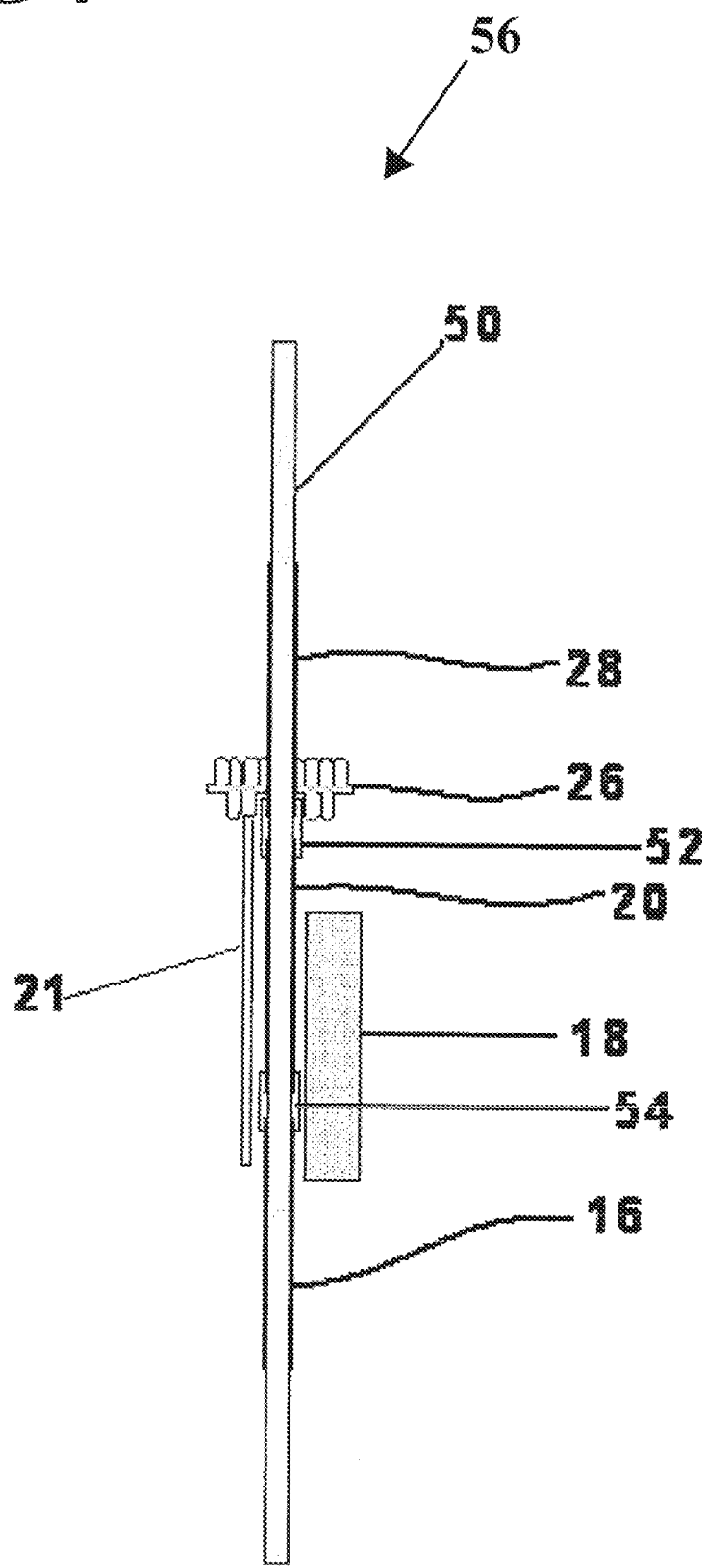
FIG. 4 depicts the circuitry and terminals of the light emitting fishing teaser during an embodiment of the manufacturing and assembly process.

Referring to FIG. 4, the circuitry and terminals of the light emitting fishing teaser are depicted during an embodiment of the manufacturing and assembly process.

The embodied light emitting fishing teaser can be manufactured by first creating an electrical assembly. A ground terminal, a first heat shrink tube, an enable terminal, a second heat shrink tube, and a charging terminal can be slid onto a manufacturing support rod. Similarly, a light emitting circuit board having a central hole can be slid onto the manufacturing support rod and the ground terminal.

Other circuitry and an energy source can be attached to the electrical assembly for support and to maintain position during the manufacturing process, or such elements can be separately encapsulated. After forming the electrical assembly, wiring can be soldered to connect the circuits and terminals of the electrical assembly, and the completed electrical assembly can be placed in a teaser-shaped mold, in which casting material can be poured which encapsulates the electrical assembly and forms a light emitting fishing teaser once set.

Electrical assembly 56 is begun by sliding three segments of brass or stainless steel tube that are the charging terminal 16, the enable terminal 20, and the ground terminal 28, onto a manufacturing support rod 50 spaced apart such that charging terminal, enable terminal, and ground terminal span an overall length of approximately 5.41 inches in embodiments.

The ground terminal is shown disposed on the manufacturing support rod adjacent to a first heat shrink tube 52. The enable terminal is shown disposed on the manufacturing support rod between first heat shrink tube and a second heat shrink tube 54. The charging terminal is shown disposed on the manufacturing support rod adjacent to the second heat shrink tube. This orientation places the enable terminal between the ground terminal and charging terminal.

An approximately 0.25 inch gap can be maintained between the charging terminal and enable terminal by the placement of the second heat shrink tube, such that when the support rod is removed after manufacturing, the charging terminal and enable terminal are adjacent but not in electrical contact.

Similarly, an approximately 0.25 inch gap can be maintained between the enable terminal and ground terminal by the first heat shrink tube such that when the support rod is removed after manufacturing, the enable terminal and ground terminal are adjacent but not in electrical contact.

The light emitting circuit board 26 is also shown disposed on the manufacturing support rod proximate to the ground terminal. The light emitting circuit board can have a central hole that allows it to slide onto the manufacturing support rod and ground terminal.

The control circuit board 21 is electrically connected to and held in position by the light emitting circuit board. The light emitting circuit board and control circuit board can be attached to the ground terminal to hold them in place during manufacturing.

The energy source 18, which can be two batteries that are wired in series and encapsulated in a heat shrink tube, is shown attached to the enable terminal for support during the manufacturing process.

During the manufacturing process, wires can be soldered to connect the energy source, charging terminal, and enable terminal to the control circuit board. Additionally a wire can be soldered to the ground terminal to connect the ground terminal to the light emitting circuit board.

Figure 5:
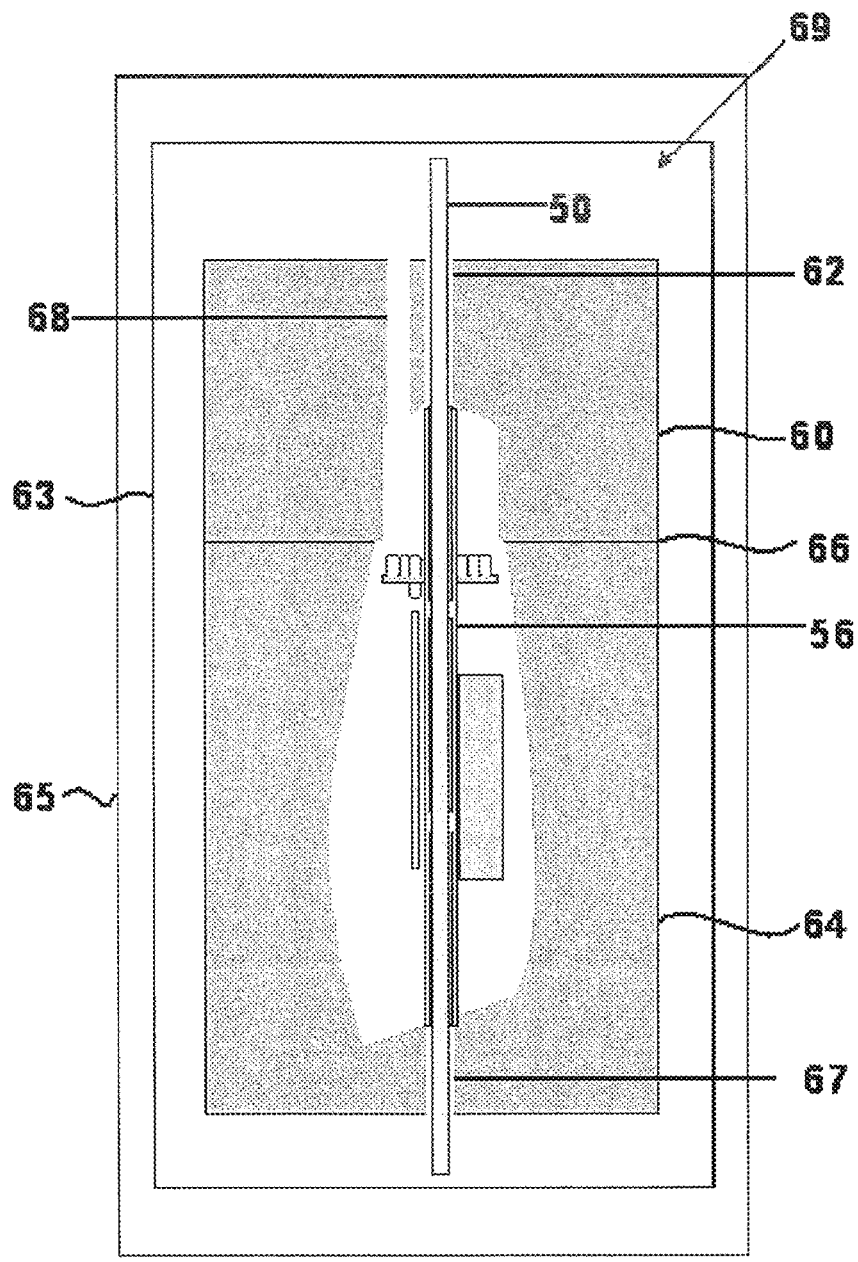
FIG. 5 depicts an embodiment of a mold assembly for manufacturing the light emitting fishing teaser.

Now referring to FIG. 5, an embodiment of a mold assembly 69 is depicted. Assembly can begin by locating an electrical assembly 56 in a lower mold 64 and an upper mold 60, which can be joined at a mold seam 66. The mold seam can be oriented such that any casting imperfections have the least impact on the outside surface of the lure head.

The electrical assembly can be first positioned in the lower mold such that the manufacturing support rod 50 extends through a lower support rod guide 67. The upper mold can be placed over the electrical assembly such that the manufacturing support rod extends through an upper support rod guide 62. The lower mold and the upper mold can be pressed together to prevent leakage of liquid urethane casting material through the mold seam.

Liquid urethane casting material, which can encapsulates the electric assembly, can be poured into the mold assembly through a pour hole 68. Afterwards, the mold assembly can be placed in a pressure container 63, that can be pressurized to approximately 45 pounds per square inch. The pressure container containing the mold assembly can then be placed in an oven 65 at approximately 130 degrees Fahrenheit for an approximately four hour curing time.

After sufficient curing time during which the liquid urethane casting material becomes solid, the pressure container can be removed from the oven and the mold assembly can be removed from the pressure container. The lower mold and the upper mold can then be separated at the mold seam and the molded lure head can be removed.

Manufacturing can be completed by removing manufacturing support rod from the molded lure head, which can leave a cylindrical lure cavity that can be at least partially formed by the charging terminal, the enable terminal, and the ground terminal. The cylindrical lure cavity can be free of casting material and can be exposed.

Figure 6:
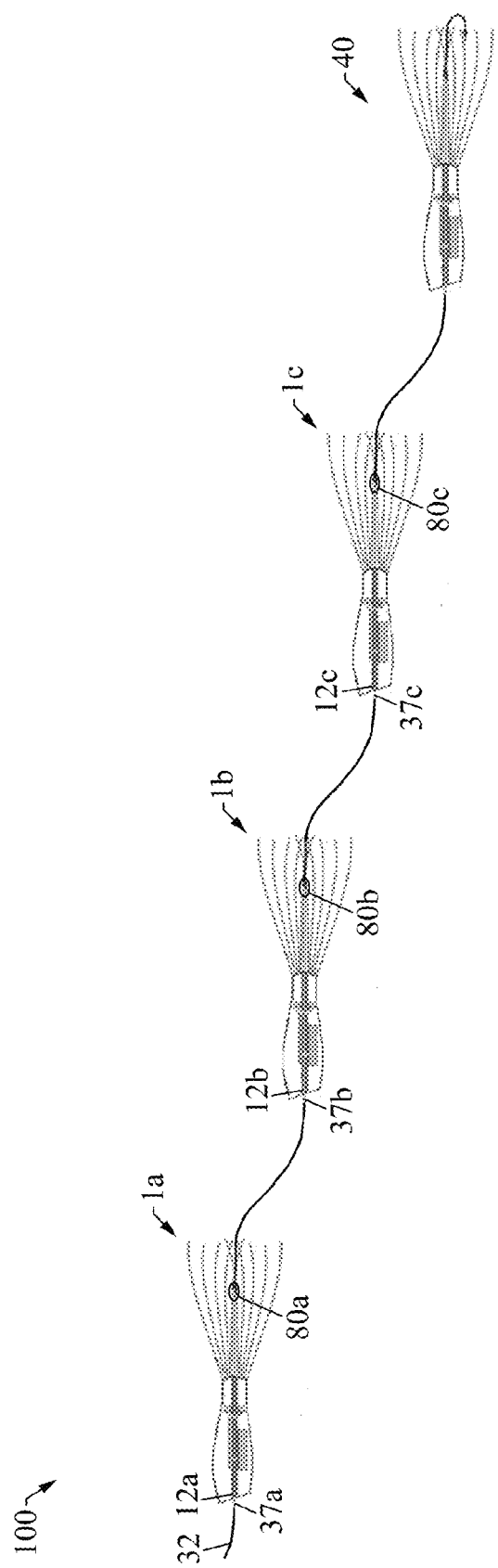
FIG. 6 depicts an embodiment of a daisy chain of light emitting fishing teasers.

FIG. 6 shows an embodiment of a daisy chain of light emitting fishing teasers 100.

The daisy chain of light emitting fishing teasers is shown with three light emitting fishing teasers 1a, 1b, and 1c. Embodiments can include other numbers of light emitting fishing teasers.

Each light emitting fishing teaser is shown with a leader 37a, 37b, and 37c. Each leader is shown extending through each respective cylindrical lure cavity 12a, 12b, and 12c.

Leader 37a is shown attached to a fishing line 32 proximate the front of light emitting fishing teaser 1a. Leader 37c is shown attached to a fishing lure 40 proximate the back of the light emitting fishing teaser 1*c*.

A first crimp 80*a* is shown disposed along the leader proximate the back of the light emitting fishing teaser 1*a* for connecting the leader with the light emitting fishing teaser 1*a*.

A second crimp 80*b* is shown disposed along the leader proximate the back of the light emitting fishing teaser 1*b* for connecting the leader with the light emitting fishing teaser 1*b*.

A third crimp 80*c* is shown disposed along the leader proximate the back of the light emitting fishing teaser 1*c* for connecting the leader with the light emitting fishing teaser 1*c*.

While these embodiments have been described with emphasis on the embodiments, it should be understood that within the scope of the appended claims, the embodiments might be practiced other than as specifically described herein.

What is claimed is:

1. A light emitting fishing teaser comprising:
   a. a translucent lure head comprising:
      (i) an exposed cylindrical lure cavity passing longitudinally through the translucent lure head and an outside surface on the translucent lure head; wherein the exposed cylindrical lure cavity accommodates water when the light emitting fishing teaser is submerged in water;
      (ii) a charging terminal located within the exposed cylindrical lure cavity;
      (iii) an encapsulated charging circuit in communication with the charging terminal;
      (iv) an enable terminal located within the exposed cylindrical lure cavity and electrically isolated from the charging terminal;
      (v) a ground terminal located within the exposed cylindrical lure cavity and electrically isolated from the charging terminal and from the enable terminal, wherein the ground terminal is in communication with the encapsulated charging circuit;
      (vi) an energy source encapsulated by the translucent lure head;
      (vii) a control circuit board encapsulated by the translucent lure head;
      (viii) a light emitting circuit board encapsulated by the translucent lure head; and
      (ix) a convex lens formed by the outside surface of the translucent lure head;
   b. a leader secured to a fishing line and extending through the charging terminal, the enable terminal, and the ground terminal, in the exposed cylindrical lure cavity and connecting to a fishing lure; and
   c. a lure skirt attached to the translucent lure head; wherein only when the exposed cylindrical lure cavity accommodates water is an electrical circuit between the charging terminal, the enable terminal, and the ground terminal completed by water in the exposed cylindrical lure cavity.

2. The light emitting fishing teaser of claim 1, wherein the translucent lure head further comprises at least one light emitting diode.

3. The light emitting fishing teaser of claim 2, wherein the translucent lure head is faceted to disperse light emitted by the at least one light emitting diode.

4. The light emitting fishing teaser of claim 2, wherein the translucent lure head comprises: an excitation circuit for controlling the illumination of the at least one light emitting diode.

5. The light emitting fishing teaser of claim 4, wherein the excitation circuit controls the illumination of the at least one light emitting diode to illuminate continuously or to flash at least one rate.

6. The light emitting fishing teaser of claim 4, wherein the excitation circuit controls the illumination of the at least one light emitting diode to illuminate in a sequence or pattern.

7. The light emitting fishing teaser of claim 4, further comprising encapsulating material disposed around the excitation circuit.

8. The light emitting fishing teaser of claim 2, wherein the translucent lure head is at least partially tinted with phosphorescent material to enhance light emitted by the at least one light emitting diode.

9. The light emitting fishing teaser of claim 2, wherein the lure skirt is tinted with phosphorescent material to enhance light emitted by the at least one light emitting diode.

10. The light emitting fishing teaser of claim 1, wherein the translucent lure head contains shapes molded in cabochon.

11. The light emitting fishing teaser of claim 1, wherein the translucent lure head is at least partially tinted at least one color.

12. The light emitting fishing teaser of claim 1, wherein the lure skirt is tinted at least one color.

13. The light emitting fishing teaser of claim 1, wherein the light emitting fishing teaser automatically activates when submerged in water.

14. The light emitting fishing teaser of claim 1, wherein the charging circuit activates when the light emitting fishing teaser is connected to a power supply.

15. The light emitting fishing teaser of claim 1, wherein the charging terminal, the enable terminal, and the ground terminal are partially encapsulated by the translucent lure head for protecting the charging terminal, the enable terminal, and the ground terminal.

16. A light emitting fishing teaser comprising:
    a. a translucent lure head comprising:
       (i) a lure cavity passing through the translucent lure head;
       (ii) a charging terminal located within the lure cavity;
       (iii) an encapsulated charging circuit in communication with the charging terminal;
       (iv) an enable terminal located within the lure cavity and electrically isolated from the charging terminal;
       (v) a ground terminal located within the lure cavity and electrically isolated from the charging terminal and from the enable terminal, wherein the ground terminal is in communication with the encapsulated charging circuit;
       (vi) an energy source encapsulated by the translucent lure head;
       (vii) a control circuit board encapsulated by the translucent lure head; and
       (viii) a light emitting circuit board encapsulated by the translucent lure head;
    b. a leader extending through the charging terminal, the enable terminal, and the ground terminal, in the lure cavity; and
    c. a lure skirt attached to the translucent lure head; wherein only when the lure cavity accommodates water is an electrical circuit between the charging terminal, the enable terminal, and the ground terminal completed by water in the lure cavity.

17. A daisy chain of light emitting fishing teasers comprising:
   a. at least two light emitting fishing teasers, wherein each light emitting fishing teaser comprises a translucent lure head, a wherein the translucent lure head comprises:
      (i) a cylindrical lure cavity passing through the translucent lure head and an outside surface on the translucent lure head; wherein the cylindrical lure cavity accommodates water when the light emitting fishing teaser is submerged in water;
      (ii) a charging terminal located within the cylindrical lure cavity;
      (iii) an encapsulated charging circuit in communication with the charging terminal;
      (iv) an enable terminal located within the cylindrical lure cavity and electrically isolated from the charging terminal;
      (v) a ground terminal located within the cylindrical lure cavity and electrically isolated from the charging terminal and from the enable terminal, wherein the ground terminal is in communication with the encapsulated charging circuit;
      (vi) an energy source encapsulated by the translucent lure head;
      (vii) a control circuit board encapsulated by the translucent lure head;
      (viii) a light emitting circuit board encapsulated by the translucent lure head;
      (ix) a convex lens formed by the outside surface of the translucent lure head; and
      (x) a lure skirt attached to the translucent lure head; wherein only when the cylindrical lure cavity accommodates water is an electrical circuit between the charging terminal, the enable terminal, and the ground terminal completed by water in the cylindrical lure cavity; and
   b. a leader secured to a fishing line and extending through the charging terminal, the enable terminal, and the ground terminal of each light emitting fishing teaser in the cylindrical lure cavity of each light emitting fishing teaser.

18. The daisy chain of light emitting fishing teasers of claim 17, further comprising a first crimp on the leader proximate a rear of the translucent lure head of a first light emitting fishing teaser of the daisy chain of light emitting fishing teasers that connects the first light emitting fishing teaser with the leader.

19. The daisy chain of light emitting fishing teasers of claim 18, further comprising a second crimp on the leader proximate a rear of the translucent lure head of a second light emitting fishing teaser of the daisy chain of light emitting fishing teasers that connects the second light emitting fishing teaser with the leader, wherein the leader extends beyond the first crimp and through the cylindrical lure cavity of the second light emitting fishing teaser.

20. The daisy chain of light emitting fishing teasers of claim 19, further comprising a third crimp on the leader proximate a rear of the translucent lure head of a third light emitting fishing teaser of the daisy chain of light emitting fishing teasers that connects the third light emitting fishing teaser with the leader, wherein the leader extends beyond the second crimp and through the cylindrical lure cavity of the third light emitting fishing teaser.

* * * * *